United States Patent [19]

Hirano et al.

[11] E Patent Number: Re. 32,980

[45] Reissued Date of Patent: Jul. 11, 1989

[54] DEVICE FOR RHYTHMICALLY DRIVING AN ELECTROMECHANICAL VIBRATOR

[75] Inventors: Mutsuo Hirano; Nagatoshi Tsunoda, both of Isesaki, Japan

[73] Assignee: Sanden Corporation, Gunma, Japan

[21] Appl. No.: 128,529

[22] Filed: Dec. 3, 1987

Related U.S. Patent Documents

Reissue of:

[64] Patent No.: 4,630,519
Issued: Dec. 23, 1986
Appl. No.: 747,368
Filed: Jun. 21, 1985

[30] Foreign Application Priority Data

Jun. 23, 1984 [JP] Japan ..... 59-128449

[51] Int. Cl.[4] ..... G10H 1/42
[52] U.S. Cl. ..... 84/1.03; 84/DIG. 12
[58] Field of Search ..... 84/1.03, DIG. 12; 128/32, 33, 41

[56] References Cited

U.S. PATENT DOCUMENTS

| | | | |
|---|---|---|---|
| 3,624,263 | 11/1971 | Uchiyama | 84/1.03 |
| 4,020,728 | 5/1977 | Robinson et al. | 84/1.03 |
| 4,064,376 | 12/1977 | Yamada | 128/33 X |
| 4,339,978 | 7/1982 | Imamura | 84/1.03 |
| 4,554,854 | 11/1985 | Kato | 84/1.03 |

*Primary Examiner*—Stanley J. Witkowski
*Attorney, Agent, or Firm*—Hopgood, Calimafde, Kalil, Blaustein & Judlowe

[57] ABSTRACT

An electromechanical vibrator driving device comprising a rhythm signal generator to produce rhythmic pulses in a pattern corresponding to a beat pattern of a selected music rhythm, the rhythmic pulses being amplified and then applied to the vibrator so that the vibrator generates a rhythmical vibration of the selected music rhythm. The rhythm signal generator comprises a rhythm pattern generator storing different rhythm patterns and providing pulses corresponding to strong beats and pulses corresponding to weak beats in a selected rhythm pattern, separately. The strong beat pulses and the weak beat pulses are processed by attenuators to have different amplitudes and are mixed to produce the rhythm signal.

6 Claims, 3 Drawing Sheets

DEVICE FOR RHYTHMICALLY DRIVING AN ELECTROMECHANICAL VIBRATOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to electromechanical vibrators and, in particular, to a device for driving an electromechanical vibrator.

2. Description of the Invention

In order to stimulate the skin and/or muscles of the human body, an electromechanical vibrator has been used in the prior art. The vibrator is usually driven by application of an A.C. electric current of a constant frequency.

A sound reproducing system has been known in the prior art as disclosed in, for example, U.S. Pat. No. 4,064,376, which reproduces from an electric signal not only sound felt by ear but also mechanical vibration, of preferably undertones lower than 150 Hz, to be directly transmitted to a body. Such a system has an electromechanical vibrator for reproducing the mechanical vibration in addition to sound reproducing speakers. An audio signal is fed to not only the speakers but also the vibrator which is fitted to a bed or a chair. The audio signal is preferably passed through a filter for removing a higher frequency component than 150 Hz and thereafter, is applied to the vibrator. A person on the chair or bed receives rhythmical stimulus to his body while enjoying music from the speaker through ear. Accordingly, he may feel better than use of the conventional electromechanical vibrator generating vibration of a constant frequency.

However, in use of the sound reproducing system for stimulating the body, the user is always forced to listen to a music.

SUMMARY OF THE INVENTION

It is an object of the present invention to provide a device for driving an electromechanical vibrator to generate rhythmical vibration corresponding to a desired musical rhythm.

It is another object of the present invention to provide a device for driving an electromechanical vibrator which can selectively use the output signal from audio system and rhythm signal generator.

According to the present invention, an electromechanical vibrator driving device is obtained which comprises means for generating a clock pulse signal of a constant lower repetition frequency, rhythm selecting means for selecting one of a plurality of different musical rhythms, rhythm signal generating means being coupled with the clock pulse generating means and the rhythm selecting means and for generating a rhythm signal, the rhythm signal comprising electric pulses having a pulse occurrence pattern corresponding to a pattern of recurrence of beats of a musical rhythm selected by the rhythm selecting means as a tempo controlled by the low repetition frequency of the clock pulse signal, and amplifier means for amplifying the rhythm signal to produce a driving signal for the vibrator.

According to an aspect of the present invention, the rhythm signal generating means comprises rhythm pattern generator means coupled with the clock pulse generating means and the rhythm selecting means, the rhythm pattern generator means having at least two output terminals from which pulses are outputted corresponding to respective beats of a music rhythm as selected, a first one of said at least two output terminals providing pulses corresponding to strong beats of the selected music rhythm while a second one of the at least two output terminals providing pulses corresponding to weak beats of the selected music rhythm, first and second attenuator means coupled with the first and second output terminals, respectively, the first attenuator means having an attenuating means lower than the second attenuator means, and mixer means coupled with outputs of the first and second attenuator means and for mixing output signals of the first and second attenuator means to provide the rhythm signal.

According to the another aspect of the present invention, the device further comprises a mode selector means for selecting one of a first mode to drive the vibrator at a desired music rhythmical vibration, and a second mode to drive the vibrator at a constant vibrating frequency. The mode selector means is connected to an output of the clock pulse generating means so that the clock pulse is applied to the rhythm pattern generator means at the first mode but is applied to the mixer means at the second mode.

According to still another aspect of the present invention, the device further comprises an input port for receiving an audio signal from an external audio system, a low-pass filter coupled with the input port, and a switch means for selectively coupling one of the rhythm signal and an output signal from the low-pass filter with the amplifier means. Thus, the user can also enjoy a music sound through ear as well as feeling a music rhythmical stimulation to his body in synchronous with the music.

Further objects, features and other aspects will be understood from the following detailed description of preferred embodiments in reference to the accompanying drawings.

DETAILED DESCRIPTION OF PREFERRED EMBODIMENTS

Figure 1:
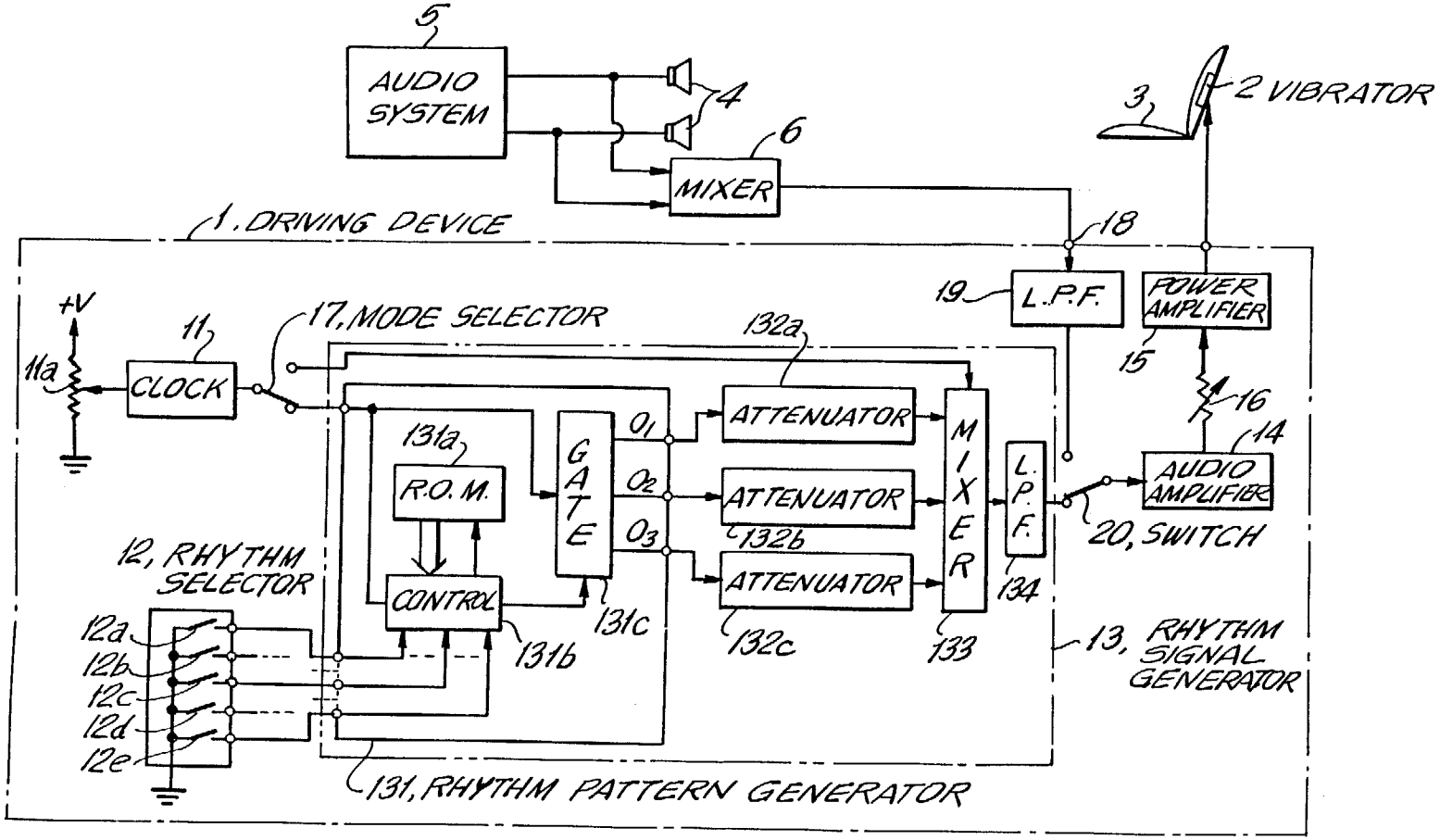
FIG. 1 is a schematic view of a circuit diagram of an embodiment of the present invention, with an external audio system and a chair with a vibrator being shown together.

Referring to FIG. 1, a driving device 1 for driving an electromechanical vibrator 2 fitted on, for example, a chair 3, comprises a clock pulse generator 11, a rhythm selector 12 and a rhythm signal generator 13.

Clock pulse generator 11 generates a clock pulse signal of a low constant repetition frequency of 2–12 Hz. The clock pulse signal is applied to rhythm signal generator 13 and controls a tempo of a rhythm. Clock pulse generator 11 may be a pulse oscillator of a fixed frequency type, but preferably, a variable frequency type having a frequency adjusting means as shown by a variable resistor 11a in the figure.

Rhythm selector 12 comprises a plurality of selector switches for selecting a desired one of different music rhythms. In this embodiment, selector switches 12a–12e correspond to beguine, bossa nova, rock-'n'-roll, march, and waltz, respectively.

Rhythm signal generator 13 receives the clock pulse signal from clock pulse generator 11 and a rhythm selection signal from rhythm selector 12, and then generates a selected rhythm signal at a tempo determined by the clock pulse repetition frequency.

Figure 2:
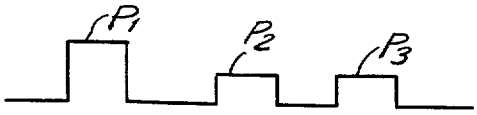
FIG. 2 is a view illustrating a rhythm signal of waltz on an output terminal of a rhythm signal generator in the device of FIG. 1.

The rhythm signal comprises pulses occurring in a pattern corresponding to a beat recurrence pattern in a selected music rhythm. For example, when selection switch 12e is operated to select a rhythm of waltz, three subsequent pulse $P_1$, $P_2$ and $P_3$ are repeatedly outputted from rhythm signal generator 13, as shown in FIG. 2. First pulse $P_1$ is corresponding to a first beat of a strong accent in the waltz rhythm and second and third pulses $P_2$ and $P_3$ are corresponding to second and third beats in the rhythm.

The rhythm signal is amplified at an audio amplifier 14 and, thereafter, is power amplified at a power amplifier 15. The power amplified signal is fed to vibrator 2. Thus, vibrator 2 is driven to generate a rhythmical vibration corresponding to the waltz rhythm. A volume or a variable resistor 16 is provided at the output of amplifier 14 so as to adjust the vibrating strength of vibrator 2.

An example of rhythm signal generator 13 comprises a rhythm pattern generator 131, attenuators 132, a mixer circuit 133, and a low-pass filter 134.

Rhythm pattern generator 131 comprises a memory unit (ROM) 131a storing data of different music rhythm patterns or patterns of regular recurrence of beats and accent in music, a control circuit 131b, a gate circuit 131c, and a plurality of output terminals.

In the shown embodiment, the rhythm pattern generator 131 is provided with three output terminals $O_1$–$O_3$. Terminal $O_1$ is for generating a pulse corresponding to a beat of a relatively strong accent in a rhythm pattern, and each terminal of $O_2$ and $O_3$ are for pulse corresponding to a beat of a relatively weak accent.

Figure 3:
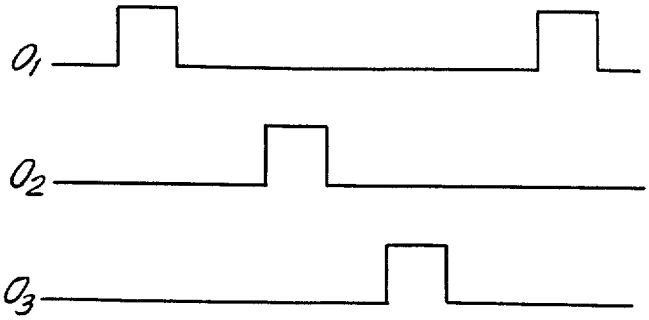
FIG. 3 is a view illustrating signals on output terminals of a rhythm pattern generator in the device of FIG. 1.

Control circuit 131b reads out the rhythm pattern data from ROM 131a according to a rhythm selected at rhythm selector 12, and controls gate circuit 131c so that the pulse signal from clock pulse generator 11 is distributed to three terminals $O_1$–$O_3$ according to the rhythm pattern, When the waltz rhythm is selected, gate circuit 131c is controlled so that a pulse is applied to terminal $O_1$ in response to first beat of a strong accent while pulses are applied to terminals $O_2$ and $O_3$ sequentially in response to second and third beats of a weak accent, as shown in FIG. 3.

A rhythm pattern generator may be used which has two output terminals, one for pulses corresponding to beats of a relatively strong accent and the other for pulses corresponding to beats of a relatively weak accent in the rhythm. Another type rhythm pattern generator can be used which has three terminals for a beat of the strongest accent, another beat of a strong accent and the other beat of a weak accent, respectively, in the rhythm. Alternatively, a rhythm pattern generator can have a number of output terminals corresponding to the maximum beat numbers in rhythm patterns stored in the ROM so that pulses corresponding to all beats in a selected rhythm pattern are outputted from different terminals.

As an example of such a rhythm pattern generator, a MOS-type integrated circuit "LM8972" can be available in commerce which is made and sold by SANYO, a Japanese corporation.

Attenuators 132a–132c are connected to output terminals $O_1$–$O_3$. Attenuator 132a, which is connected to a pulse output terminal $O_1$ corresponding to a strong beat, has a small attenuating factor, while each of the other attenuator 132b and 132c connected to terminals $O_2$ and $O_3$ has a large attenuating factor. Therefore, the output pulse from attenuator 132a has a large amplitude, while the other pulses from attenuators 132b and 132c have a small amplitude. The pulses from attenuators 132a–132c are mixed at mixer circuit 133 to form time-serial pulse signal.

The pulse signal is applied to low-pass filter 134 to remove a high-frequency component. Thus, a rhythm signal corresponding to the waltz rhythm can be obtained from low-pass filter 134.

When a different music rhythm, for example, march rhythm is selected at rhythm selector 12, pulse corresponding to strong beats in the rhythm are outputted from output terminal $O_1$ and pulses to weak beats in the rhythm are provided from either one of output terminals $O_2$ and $O_3$. Those pulses are processed at attenuators 132a–132c, mixer 133 and low-pass filter 134 in the similar manner, so that a rhythm signal corresponding to the march rhythm is obtained from low-pass filter 134.

A rhythm signal corresponding to one of the other rhythms can be also obtained in the similar manner.

Accordingly, vibrator 2 can be driven to generate a rhythmical vibration of a desired music rhythm.

The driving device of FIG. 1 is further provided with a mode selection switch 17 for selecting one of a first and a second modes. The first mode is one where a desired music rhythm can be selected, while vibrator 2 is driven at a constant frequency in the second mode. The mode selection switch 17 is provided at the output side of clock pulse generator 11 so that the clock pulse is selectively supplied to rhythm pattern generator 131 and mixer 133 through the mode selection switch 17.

When the first mode is selected at mode selection switch 17, the clock pulse is supplied to rhythm pattern generator 131. On the other hand, when the second mode is selected, the clock pulse is fed to mixer 133 and is thereafter applied to amplifier 14 through low-pass filter 134. Then, the amplified clock pulse is power-amplified at power amplifier 15, and is supplied to vibrator 2. Thereafter, vibrator 2 is driven at the constant frequency of the clock pulse.

The device of FIG. 1 is also provided with an audio signal input port 18, which is selectively connected to audio amplifier 14 through a low-pass filter 19 by a selection switch 20.

When audio output to speakers 4 in an external audio system 5 is applied to audio input port 18 through a mixer 6, and when selection switch 20 is switched from rhythm signal generator 13 to low-pass filter 19, the audio signal is applied to vibrator 2. Thus, a user on the chair can enjoy a music sound from speakers 4 while feeling vibration synchronous with rhythm of the music.

Figure 4:
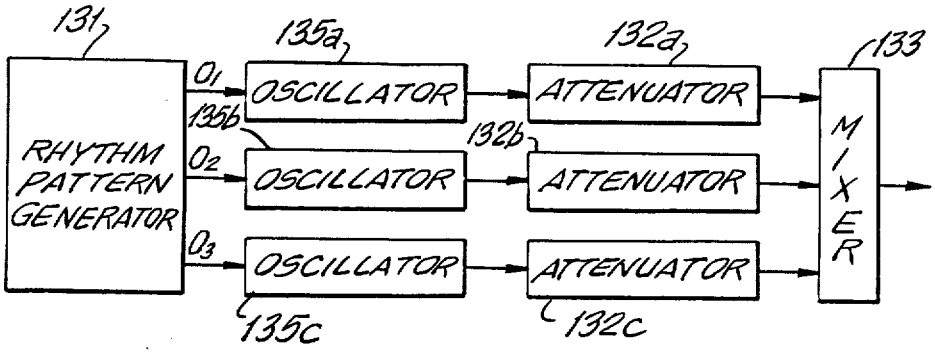
FIG. 4 is a diagrammatic circuit view of a main portion of another embodiment.

Referring to FIG. 4, rhythm signal generator 13 is provided with oscillators 135a–135c at all output terminals $O_1$–$O_3$ of rhythm pattern generator 131. These oscillators 135a–135c are driven by output signals from output terminals $O_1$–$O_3$, respectively. Oscillating frequencies of oscillators 135a–135c are designed higher than the repetition frequency of the clock pulse, and are different to one another. But, they can be designed equal to one another.

Figure 5:
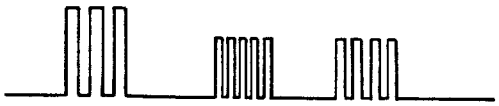
FIG. 5 is a view for illustrating a rhythm signal of waltz obtained in the embodiment of FIG. 4.

When the waltz rhythm is selected, pulse signals are outputted from terminals $O_1$–$O_3$ as shown in FIG. 2. Oscillators 135a–135c operate during pulse durations of the input pulses, respectively. Those oscillating output signals are attenuated at oscillators 132a–132c and are mixed at mixer 133. Thus, a rhythm signal is obtained as shown in FIG. 5.

It should be noted that the oscillating frequency of each oscillator of 135a–135c must be selected lower than the cut-off frequency of the low-pass filter 134.

According to this embodiment, vibrator 2 vibrates at the higher frequency in addition to the music rhythmic vibration.

Figure 6:
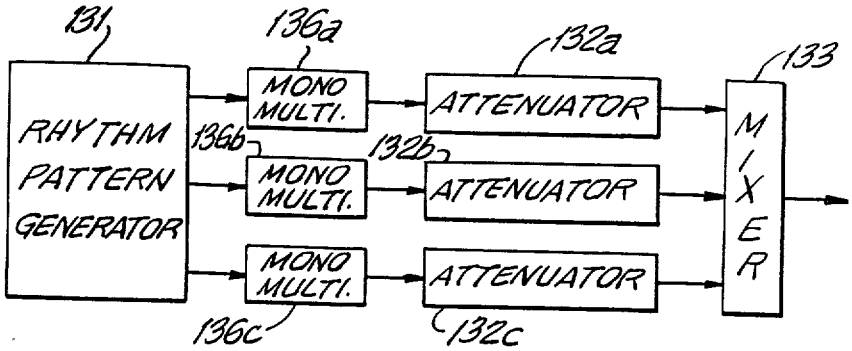
FIG. 6 is a diagrammatic circuit view of a main portion of still another embodiment.

Referring to FIG. 6, rhythm signal generator 13 is provided with mono-stable multivibrators 136a–136c, so that the pulses on output terminals $O_1$–$O_2$ are applied to and drive multivibrators 136a–136c, from which pulses are outputted with changed pulse durations.

It is desired that an astable time period of mono-stable multivibrator 136a is designed larger than that of each other multivibrator of 136b and 136c. The astable time periods of multivibrators 136b and 136c are designed different from one another, but can be equal to one another.

Figure 7:
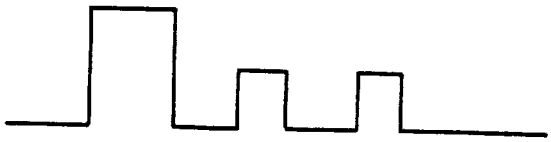
FIG. 7 is a view for illustrating a rhythm signal of waltz obtained in the embodiment of FIG. 6.

Thus, the rhythm signal, upon waltz being selected, can be obtained as shown in FIG. 7.

A plurality of vibrators 2 can be driven by provision of a plurality of power amplifiers on the output of audio amplifer 14.

What is claimed is:

1. A driving device for an electromechanical vibrator comprising:

means for generating a clock pulse signal of a constant repetition frequency of less than about 12 Hz;

rhythm selecting means for selecting one of a plurality of different musical rhythms;

rhythm signal generating means including rhythm pattern generator means coupled with said clock pulse generating means and said rhythm selecting means, said rhythm pattern generator means having at least two output terminals from which electric pulses are outputted corresponding to respective beats of a music rhythm as selected by said rhythm selecting means at a tempo controlled by the repetition frequency of said clock pulses, a first one of said at least two output terminals providing pulses corresponding to strong beats of the selected music rhythm while a second one of said at least two output terminals providing pulses corresponding to weak beats of said selected music rhythm, first and second attenuator means coupled with said first and second output terminals, respectively, said first attenuator means having an attenuation factor lower than said second attenuator means, and mixer means coupled with the outputs of said first and second attenuator means for mixing the output signals of said first and second attenuator means to provide said rhythm signal;

mode selector means for selecting one of a first mode to drive said electromechanical vibrator at a desired music rhythmical vibration, and a second mode to drive said electromechanical vibrator at a constant vibration frequency, said mode selector means being connected to an output of said clock pulse generating means so that the clock pulse is applied to said rhythm pattern generator means in said first mode but is applied to said mixer means in said second mode; and amplifier means for amplifying said rhythm signal to produce a driving signal for said electromechanical vibrator.

2. The electromechanical vibrator driving device as claimed in claim 1, wherein said rhythm signal generating means further comprises first and second oscillator means being driven during pulse durations of pulses generated on first and second output terminals of said rhythm pattern generator means, respectively, each of said first and second oscillator means oscillating at a low frequency but higher than said clock pulse repetition frequency, outputs of said first and second oscillator means being applied to said first and second attenuator means, respectively.

3. The electromechanical vibrator driving device as claimed in claim 1, wherein said rhythm signal generating means further comprises first and second mono-stable multivibrator means coupled with said first and second output terminals of said rhythm pattern generator means, respectively, to thereby producing pulses of a converted pulse duration, the pulses of a converted pulse duration from said first and second mono-stable multivibrator means, respectively.

4. The electromechanical vibrator driving device as claimed in claim 3, wherein said first mono-stable multivibrator means has an astable time period longer than said second mono-stable multivibrator means.

5. The electromechanical vibrator driving device as claimed in claim 1, which further comprises an input port for receiving an audio signal from an external audio system, a low-pass filter coupled with said input port, and a switch means for selectively coupling one of said rhythm signal and an ouput signal from said low-pass filter with said amplifier means.

6. The electromechanical vibrator driving device as claimed in claim 1, wherein said rhythm signal generator means further comprises low-pass filter means at an output side of said mixer means, from which said rhythm signal is obtained with any high frequency component being eliminated.

* * * * *